United States Patent
Kluczynski et al.

(10) Patent No.: US 8,654,339 B2
(45) Date of Patent: Feb. 18, 2014

(54) METHOD FOR REDUCING INTERFERENCE FRINGES BY MOVING TIMING OF TRIANGULAR MOTION

(75) Inventors: Pawel Kluczynski, Västra Frölunda (SE); Rikard Larking, Floda (SE)

(73) Assignee: Siemens Aktiengesellschaft, Munich (DE)

( * ) Notice: Subject to any disclaimer, the term of this patent is extended or adjusted under 35 U.S.C. 154(b) by 661 days.

(21) Appl. No.: 12/999,928

(22) PCT Filed: Jun. 19, 2009

(86) PCT No.: PCT/EP2009/057654
§ 371 (c)(1),
(2), (4) Date: Dec. 17, 2010

(87) PCT Pub. No.: WO2009/153338
PCT Pub. Date: Dec. 23, 2009

(65) Prior Publication Data
US 2011/0090498 A1    Apr. 21, 2011

(30) Foreign Application Priority Data
Jun. 20, 2008   (EP) .................................. 08011277

(51) Int. Cl.
*G01B 9/02*    (2006.01)
(52) U.S. Cl.
USPC .......................................... 356/450; 356/454

(58) Field of Classification Search
USPC .................................. 356/450–452, 506, 519
See application file for complete search history.

(56) References Cited

U.S. PATENT DOCUMENTS

| | | | |
|---|---|---|---|
| 4,684,258 A | | 8/1987 | Webster |
| 4,934,816 A | | 6/1990 | Silver et al. |
| 5,267,019 A | * | 11/1993 | Whittaker et al. ............ 356/437 |
| 7,800,764 B2 | | 9/2010 | Kluczynski |

FOREIGN PATENT DOCUMENTS

EP           1 927 831         6/2008

* cited by examiner

*Primary Examiner* — Hwa Lee
(74) *Attorney, Agent, or Firm* — Cozen O'Connor

(57) ABSTRACT

A method for reducing fringe interference of light created in a passive cavity defined by partially reflecting optical surfaces in a laser spectroscopy system, wherein the optical path length of the cavity is varied with a triangular back-and-forth movement (x). In accordance with the invention, the spectroscopic measurement is performed in successive measurement cycles with a time interval between each two successive measurement cycles, the triangular movement is performed such that the turning points of the triangular movement (x) are positioned in successive ones of the time intervals, and after each or at each n-th measurement cycle, the time position of the turning points is moved relative to the measurement cycle.

7 Claims, 3 Drawing Sheets

METHOD FOR REDUCING INTERFERENCE FRINGES BY MOVING TIMING OF TRIANGULAR MOTION

CROSS-REFERENCE TO RELATED APPLICATIONS

This is a U.S. national stage of International Application No. PCT/EP2009/057654, filed on 19 Jun. 2009.

This patent application claims the priority of European patent application EP 08 011 277 filed 20 Jun. 2008, the entire content of which application is incorporated herein by reference in its entirety.

BACKGROUND OF THE INVENTION

1. Field of the Invention

The invention relates to noise reduction and, more particularly, to a method for reducing fringe interference of light created in a passive cavity defined by partially reflecting optical surfaces in a laser spectroscopy system, where the optical path length of the cavity is varied with a triangular back-and-forth movement.

2. Description of the Related Art

Laser absorption spectroscopy offers high speed and high precision capabilities for detection of numerous trace gas species in gas mixtures at atmospheric pressure with a small cross sensitivity towards other gas components. Tunable diode laser spectrometers are particularly suited to high sensitivity studies, in part because they may be frequency modulated to reduce low frequency laser noise and electronic noise. A typical spectrometer includes a frequency tunable laser for generating a laser beam which passes through a sample cell containing the gas mixture onto an optical detector. The signal received at the optical detector is demodulated to obtain an absorption induced signal.

Unfortunately, the sensitivity is limited by optical noise caused by light that is scattered or reflected by partially reflecting optical surfaces of the sample cell and of other optical elements of the optical system of the laser spectrometer, such as windows or lenses. Parallel optical surfaces form passive optical cavities or etalons which may create the so-called etalon effect when the reflected or scattered light reaches the optical detector and coherently mixes with the primary laser beam. When the laser is frequency or wavelength tuned through the range of the desired absorption signal, the mixing generates a random sinusoidal modulation of the base-line. Here, the period of the sinusoidal fringe depends on the path length difference between the stray light and the main beam. The light impinging on the detector comprises one main component and many stray components of smaller amplitude, thus creating, as the laser wavelength is scanned, a periodic wavelength dependent stationary pattern of several sinusoidal components which, even when very weak, can easily obscure the absorption signal of interest from the sample and thus affect the accuracy of the spectrometer.

The reflections causing the interference fringes are extremely difficult to completely eliminate even with high quality anti-reflection coatings and careful optical alignment. Moreover, the phase of the base line fringes is very sensitive to small variations in the alignment of the optical system when the pattern changes with the ambient temperature of the spectrometer device.

The interference pattern is deterministic rather than random so that normal averaging of the laser scans fails to reduce the interferences. One well-known effective way to reduce the fringes is to vary the path length of the stray components by vibrating the position of an optical element in the laser spectrometer.

U.S. Pat. No. 4,684,258 to Webster describes the insertion of a vibrating Brewster plate between two etalon creating surfaces and thus periodically changing the optical path length of the etalon. U.S. Pat. No. 4,934,816 to Silver et al. describes a similar mechanical approach, where etalon effects in a multipass cell are reduced by introducing a vibrating mirror. In both cases, however, the vibration frequency is asynchronous with the laser modulation frequency so that the fringe pattern due to etalon effects will be averaged out. Moreover, both approaches disclosed in the Webster and Silver et al. patents use a triangular waveform to drive the plate and mirror into oscillation, respectively.

A triangular waveform offers better etalon fringe reduction in comparison to square or sinusoidal waveforms because the time spent by the vibrating element at the turning points is minimized. Unfortunately, this approach has two drawbacks. Firstly, generation of a triangular waveform requires a highly linear electromechanical transducer and imposes high requirements on the electromechanical setup. Secondly, in practice, the vibration amplitude of the optical element has to be more than 30 Free Spectral Ranges (FSRs) or 15 laser wavelengths to obtain a sufficient reduction of the etalon effect. This becomes especially impractical when longer laser wavelengths are used thus imposing higher power consumption and placing a higher demand on the mechanical components (for example, standard piezo-transducers have limited length expansion capabilities). Moreover, unwanted displacement/defocusing of the laser beam may appear when the position of the element oscillates with large amplitudes.

EP 1 927 831 discloses varying the optical path length of the passive optical cavity with a Gaussian (normal) distribution, where the standard deviation is at least one-quarter of the light's wavelength. Thus, compared to triangular modulation which requires vibration amplitudes over several laser wavelengths, an efficient etalon averaging is obtained already at amplitudes following a Gaussian distribution with a standard deviation slightly above one-quarter wavelength. Another advantage is that, due to the character of noise modulation, there is no need to amplitude and phase control the modulating waveform, thus allowing a much simpler hardware design. On the other hand, the random (noise) modulation contains high frequency components which exert higher acceleration forces on the moving mechanics.

SUMMARY OF THE INVENTION

It is therefore an object of the invention to provide a method for improving the reduction of optical noise in a laser spectroscopy system, where the optical path length of the passive optical cavity is varied with a triangular waveform.

This and other objects and advantages are achieved in accordance with the invention by a method in which the spectroscopic measurement is performed in successive measurement cycles with a time interval between each two successive measurement cycles, the triangular movement is performed such that turning points of the triangular movement are positioned in successive ones of the time intervals, and after each or at each n-th measurement cycle, the time position of the turning points is moved relative to the measurement cycle.

Moving the time positions of the turning points of the triangular mechanical scan (i.e. varying the path length of the optical cavity) relative to the laser spectral scan increases the efficiency in the averaging of the baseline pattern. This reduces the demand to scan over many periods of the interference pattern. Moreover, as the turning points are positioned in the intervals between the measurement cycles, the impact of the turning points of the mechanical scan on the measurement is minimize and the measurement will be free from the disturbance normally caused by the slowdown of the movement or the rapid acceleration at the turning point. The time position of the turning points is always varied, e.g., moved forwards and backwards, in the time intervals between the measurement cycles so that several time positions of the turning point are represented in each averaged measurement value.

In an embodiment, one of the optical elements of the laser spectrometer, including the laser head, is driven in triangular oscillation to vary the optical length of the passive optical cavity.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be now described, by way of example, with reference to the accompanying drawings, in which.

DETAILED DESCRIPTION OF THE PREFERRED EMBODIMENTS

Figure 1:
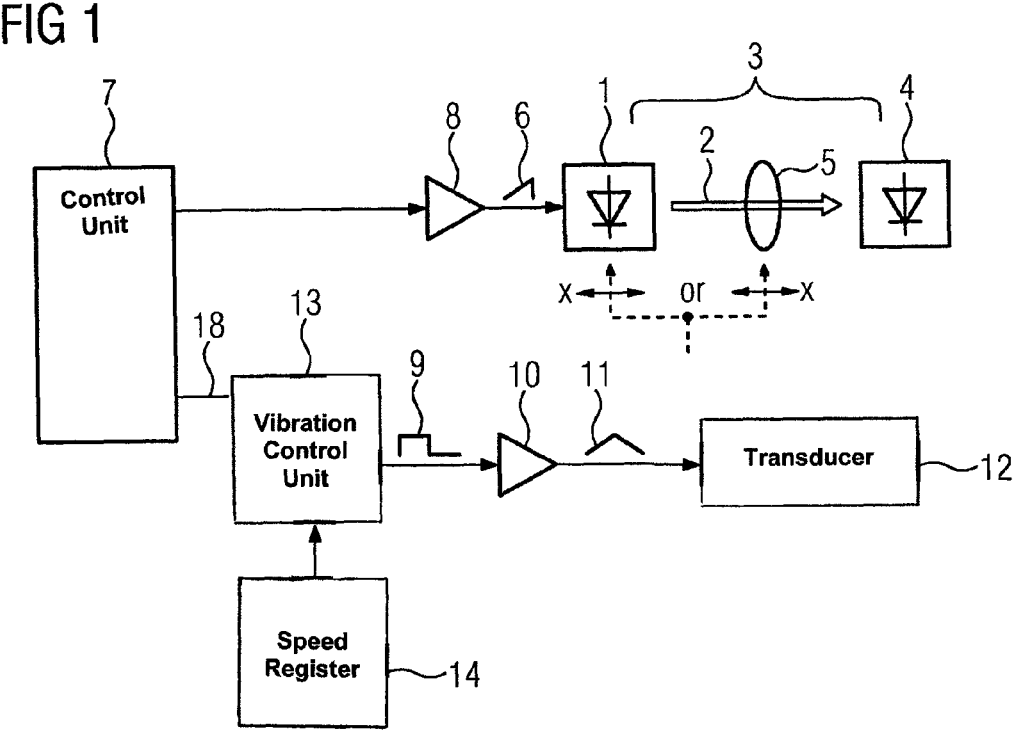
FIG. 1 is a schematic block diagram of a laser spectroscopy system for reducing fringe interference created in a passive cavity where the optical path length of the cavity is varied with triangular back-and-forth movement.

FIG. 1 shows a simplified schematic block diagram of a laser spectrometer including a frequency tunable laser 1 for generating a laser beam 2 which passes through an optical system 3 onto an optical detector 4. The optical system 3 comprises a sample cell (not shown) containing a trace gas species in a gas mixture and further optical elements, such as a collimating lens 5. The laser 1 is modulated with a triangular or sawtooth modulation signal 6 to sweep the laser wavelength across specific absorption lines of the trace gas to be determined. The modulation signal 6 is generated by a control unit 7 and applied by a laser driver 8 to the laser 1. The signal received at the optical detector 4 is demodulated to obtain an absorption induced signal.

Partially reflecting optical surfaces of the sample cell and of other optical elements of the optical system 3, such as windows or lenses, form a passive optical cavity (etalon). This etalon may create an etalon effect when light reflected or scattered by the optical surfaces reaches the detector 4 and interferes with the primary beam 2. When the laser beam 2 propagates through the etalon, multiple reflections inside the etalon will give rise to standing waves, and in consequence the transmitted light intensity will vary periodically with the laser wavelength. As the laser wavelength is scanned, the optical transmission will follow a periodical pattern, the phase of which will depend on the total etalon length. This etalon fringe pattern may obscure the absorption signal of interest from the sample and thus affect the accuracy of the spectrometer. If the etalon length is changed by exactly $\Delta L = m \cdot h/4$, where m is an odd number, the etalon fringe pattern at the laser wavelength h will be reversed. Thus, by changing the etalon length back and forth, the unwanted periodic fringe pattern can be averaged out yielding flat optical transmission.

To vary the optical length of the passive cavity, the position of one of the optical elements, e.g., the laser 1 or the lens 5, is varied by vibration along the laser beam direction with a triangular back-and-forth movement (x). The control unit 7 generates, synchronously with the laser modulation signal 6, a rectangular vibrator driver signal 9 which is converted by a vibrator driver 10 into a synchronous triangular signal 11, according to which a vibrator or electromechanical transducer 12 controls the position or movement (x) of the respective optical component 1 or 5. The time position of the edges of the rectangular vibrator driver signal 9 and thus of the turning points of the triangular back-and-forth movement (x) may be varied by a vibrator control unit 13 under control of a moving speed register 14.

Figure 2:
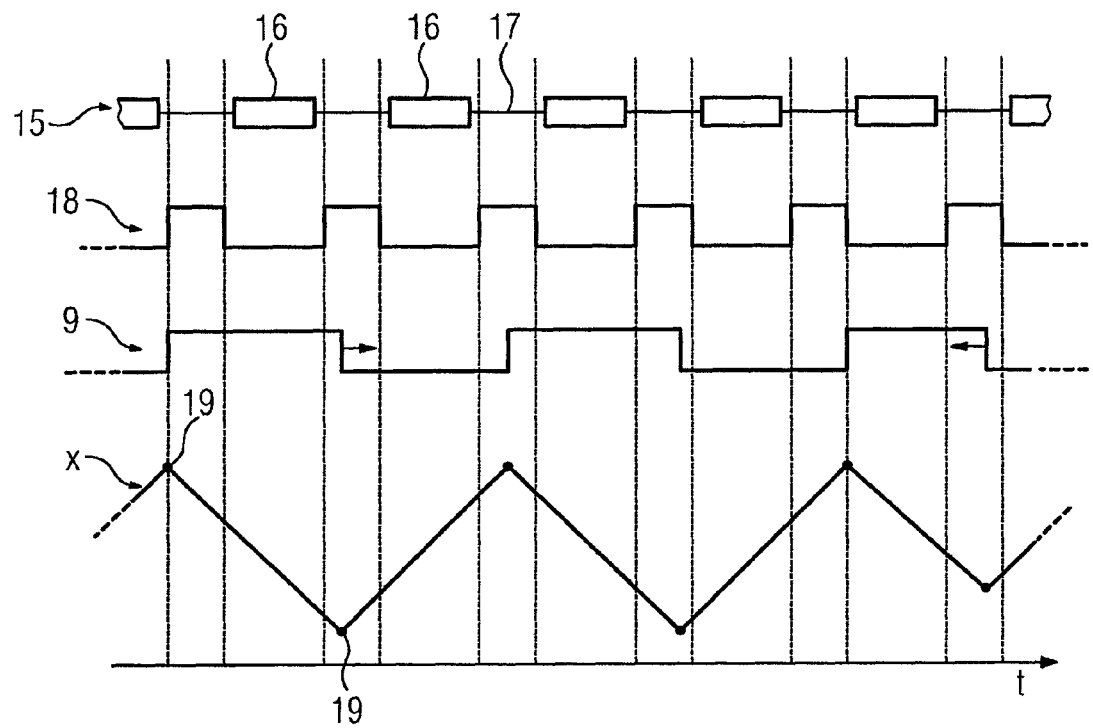
FIG. 2 is a graphical plot of a time diagram illustrating the generation of the triangular movement in accordance with an embodiment of the invention.

As FIG. 2 shows, the spectroscopic measurement 15 is performed in successive measurement cycles 16 with a constant time interval 17 between each two successive measurement cycles 16. The time interval 17 is defined by a time window signal 18 which is generated by the control unit 7 and used to control the moving speed register 14. Each measurement cycle 16 may comprise one or more laser scans (modulation signal 6). The rectangular vibrator driver signal 9 is generated synchronously with the measurement cycles 16, so that the turning points 19 of the triangular movement (x) are positioned in successive ones of the time intervals 17. Within the time intervals 17, the temporal position of the edges of the rectangular vibrator driver signal 9 and thus the temporal position of the turning points 19 is moved relative to the measurement cycles 16. This may be performed after each or at each nth measurement cycle 16. In the illustrated example, the back-and-forth movement sections of the triangular movement (x) are first lengthened by a small amount so that the turning point 19 incrementally moves forth from the beginning to the end of the time interval 17. When the end of the time interval 17 is reached, the back-and-forth movement sections of the triangular movement (x) are shortened by a small amount so that the turning point 19 incrementally moves back from the end to the beginning of the time interval 17. This procedure is repeated every time the turning point 19 reaches the limits of the time interval 17.

Figure 3:
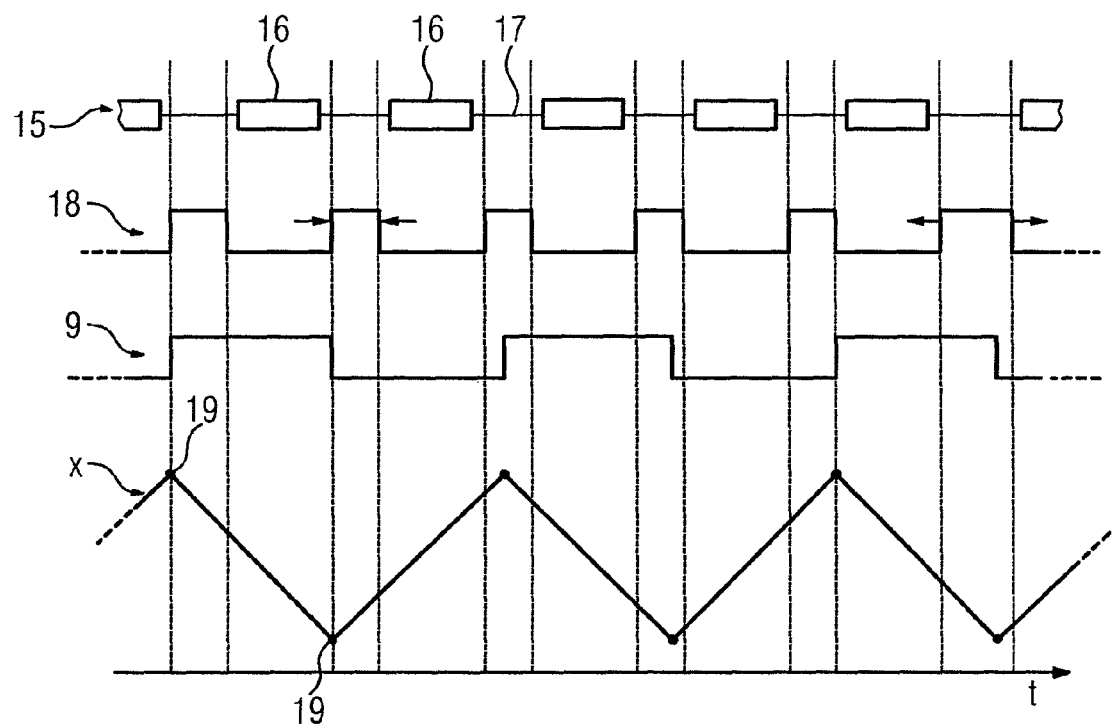
FIG. 3 is a graphical plot of a timing diagram illustrating the generation of the triangular movement in accordance with an alternative embodiment of the invention.

In the example shown in FIG. 3, the relative movement of the time position of the turning points 19 is performed by lengthening or shortening the length of the time interval 17, whereas the lengths of the back-and-forth movement sections of the triangular movement x are constant. As shown, the time interval 17 is first shortened by a small amount so that the turning point 19 incrementally moves forth from the beginning to the end of the time interval 17. When the end of the time interval 17 is reached, the time interval 17 is lengthened by a small amount so that the turning point 19 incrementally moves back from the end to the beginning of the time interval 17. This procedure is repeated every time the turning point 19 reaches the limits of the time interval 17.

While FIGS. 2 and 3 show an incremental back-and-forth movement of the time positions of the turning points 19 between the limits of the time interval 17, the movement of the time positions may be alternatively performed randomly within the time intervals 17.

The forth movement section and the back movement section of the triangular movement do not need to be equal, i.e. the movement may be sawtooth-like. Further, the measurement 15, i.e. the measurement cycles 16, may be limited to one or the other of the two back-forth movement sections.

Figure 4:
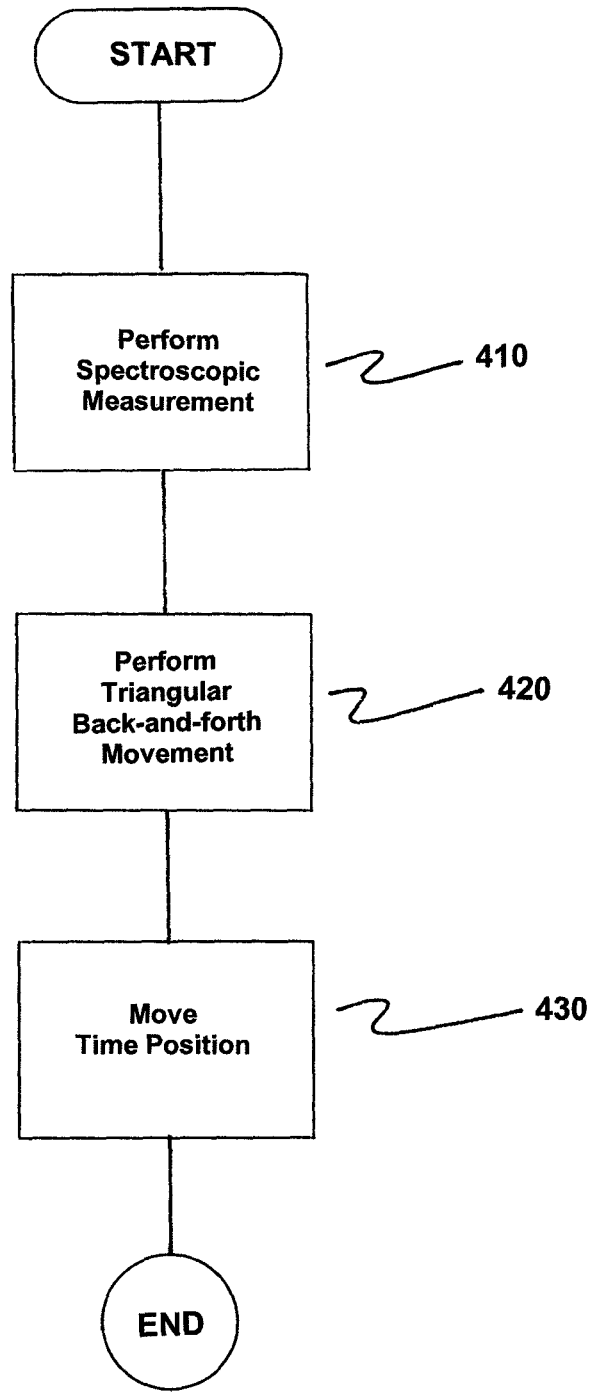
FIG. 4 is a flow chart of the method in accordance with an embodiment of the invention.

FIG. 4 is a method for reducing fringe interference of light created in a passive cavity defined by partially reflecting optical surfaces in a laser spectroscopy system, where the optical path length of the cavity is varied with a triangular back-and-forth movement (x). The method comprises performing a spectroscopic measurement (15) in successive measurement cycles (16) at a time interval (17) between each two successive measurement cycles (16), as indicated in step 410. The triangular back-and-forth movement (x) is performed such that turning points (19) of the triangular back-and-forth movement (x) are positioned in successive ones of time intervals (17), as indicated in step 420. A time position of the turning points (19) is moved relative to the measurement cycle (16) after each or at each n-th measurement cycle (16), as indicated in step 430.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A method for reducing fringe interference of light created in a passive cavity defined by partially reflecting optical surfaces in a laser spectroscopy system, wherein the optical path length of the cavity is varied with a triangular back-and-forth movement, the method comprising:
   performing a spectroscopic measurement in successive measurement cycles at a time interval between each two successive measurement cycles;
   performing the triangular back-and-forth movement such that turning points of the triangular back-and-forth movement are positioned in successive ones of time intervals; and
   moving a time position of the turning points relative to the measurement cycle after each or at each n-th measurement cycle.

2. The method of claim 1, wherein a length of the time interval is constant and a relative movement of a time position of the turning points is performed by one of lengthening and shortening back-and-forth movement sections of the triangular back-and-forth movement.

3. The method of claim 1, wherein a relative movement of a time position of the turning points is performed by one of lengthening or shortening the time interval.

4. The method of claim 1, wherein a relative movement of a time position of the turning points is performed randomly.

5. The method of claim 1, wherein a relative movement of a time position of the turning points is performed incrementally back-and-forth between a beginning and an end of the time interval.

6. The method of claim 2, wherein the relative movement of the time position of the turning points is performed incrementally back-and-forth between a beginning and an end of the time interval.

7. The method of claim 3, wherein the relative movement of the time position of the turning points is performed incrementally back-and-forth between a beginning and an end of the time interval.

* * * * *